United States Patent [19]

Takaguchi

[11] Patent Number: 4,645,392
[45] Date of Patent: Feb. 24, 1987

[54] DECK FITTING
[75] Inventor: Hiroyuki Takaguchi, Nagasaki, Japan
[73] Assignee: Taiyo Seiki Iron Works Co., Ltd., Osaka, Japan
[21] Appl. No.: 725,654
[22] Filed: Apr. 22, 1985
[51] Int. Cl.[4] .......................... B60P 7/08; B61D 45/00
[52] U.S. Cl. ........................................ 410/80; 410/82; 410/101; 248/499; 403/349
[58] Field of Search .......................... 410/77, 78, 80, 82, 410/84, 85, 90, 91, 101, 104, 105, 116, 81, 113, 114; 403/322, 348, 349; 24/109, 265 CD, 287; 248/499, 222.3, 500, 505; 114/75

[56] References Cited

U.S. PATENT DOCUMENTS

| | | | |
|---|---|---|---|
| 3,556,457 | 1/1971 | Patnaude | 410/101 |
| 3,647,172 | 3/1972 | Van Der Molen | 410/85 |
| 3,776,169 | 12/1973 | Strecker | 410/77 |
| 3,860,209 | 1/1975 | Strecker | 410/116 |
| 3,973,684 | 8/1976 | DiMartino | 410/85 |
| 4,400,856 | 8/1983 | Tseng | 410/116 |

FOREIGN PATENT DOCUMENTS 2903101  7/1980  Fed. Rep. of Germany ........ 410/82

Primary Examiner—Robert B. Reeves
Assistant Examiner—Dennis C. Rodgers
Attorney, Agent, or Firm—Wenderoth, Lind & Ponack

[57] ABSTRACT

A deck fitting for securing a container on the deck of a ship including a socket member fixed to the deck and a coupling member removably attached to the socket member. The base portion of the coupling member has a pair of projections. The socket member has a circular hole and a flange formed at the periphery of the hole and partially cut away. The projections on the coupling member is inserted into under the flange of the socket member through the cutaway portion and then the coupling member is turned.

5 Claims, 8 Drawing Figures

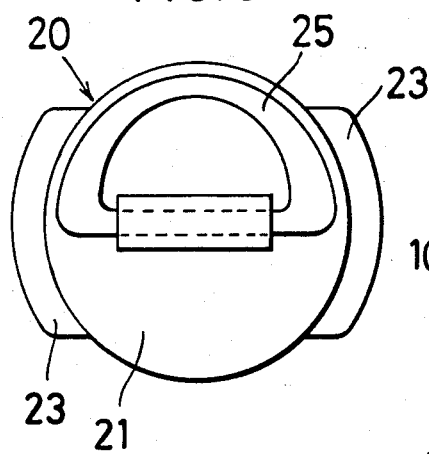
FIG. 5
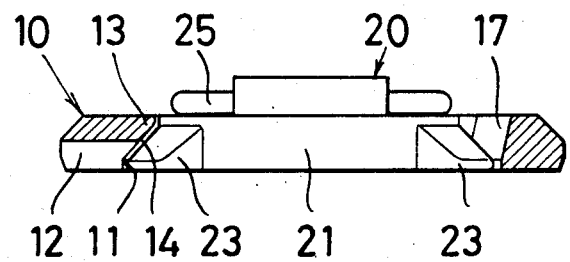
FIG. 6
FIG. 7
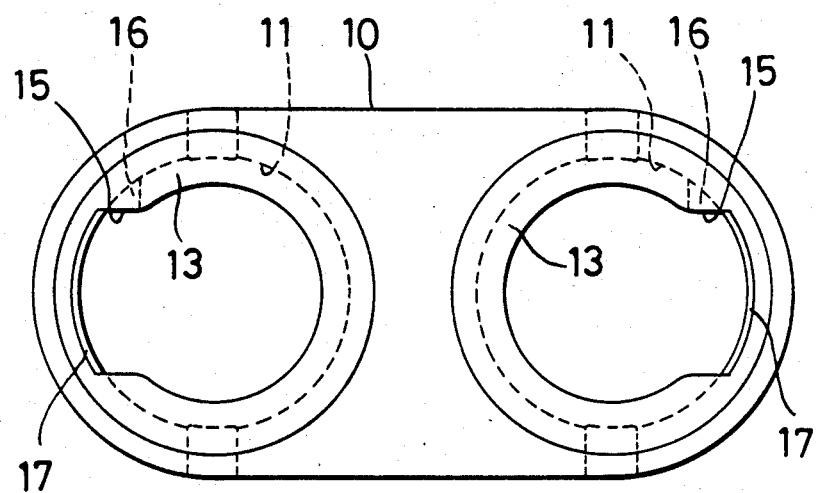
FIG. 8
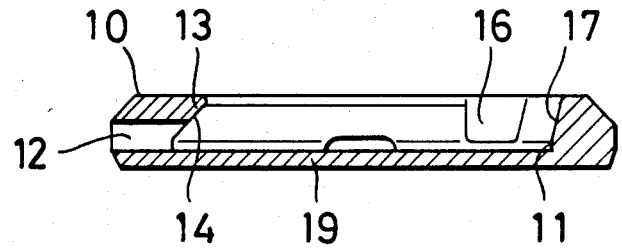

DECK FITTING

BACKGROUND OF THE INVENTION

The present invention relates to a deck fitting to be mounted on a supporting surface such as the deck or hatch of a ship.

Containers on a ship are liable to get out of position or collapse during transit if they are merely rested on the supporting surface of a ship.

FIG. 1 shows an ordinary arrangement for securing a container A. This arrangement includes positioning cones 1 and lashing terminals 2 fixed on the supporting surface of a freighter. The container is positioned by the positioning cones 1 inserted into holes provided at the four corners of its undersurface. One end of a stay 4 adapted to be tightened by a turnbuckle is secured in a hole 3 provided at each of the upper four corners of the container, while its other end is secured to the lashing terminal 2.

Because they are fixed on and protrude from the supporting surface, the conventional positioning cones 1 and lashing terminals 2 have the disadvantage that they hinder the cargo-handling carts from running on the supporting surface and are liable to be damaged by the cargo-handling carts colliding therewith. In order to eliminate the above-described disadvantage, the Japanese laid-open publication No. 51-37781 provides a deck socket comprising a fixed coupling member in the form of a socket secured to the supporting surface and a detachable coupling member such as a positioning cone or a lashing terminal adapted to be received in the fixed coupling member. Only when the freighter is loaded with containers, the detachable coupling member is attached to the fixed coupling member. The detachable coupling member is prevented from slipping out of the fixed coupling member by a plurality of claws provided on the fixed coupling member and adapted to engage with a plurality of claws provided on the detachable coupling member. The trouble is that the claws are susceptible to damage because they are not strong enough to withstand a sudden jerk given to the detachable coupling member. In addition, it is practically difficult to precisely machine both the fixed and detachable coupling members so as to allow all the claws to undergo even load. Therefore, a specific one of these claws is liable to be damaged.

SUMMARY OF THE INVENTION

It is an object of the present invention to provide a deck fitting which has a larger strength than the conventional deck socket.

It is another object of the present invention to provide a deck fitting, the detachable coupling member of which can be easily attached to and detached from a fixed coupling member.

With the above-described objects in view and as will become apparent from the following detailed description, the present invention will be more clearly understood in connection with the accompanying drawings.

BRIEF DESCRIPTION OF THE DRAWINGS

FIG. 5 is a plan view of a second embodiment of the coupling member;

FIG. 6 is a vertical sectional front view of the socket member with the second embodiment of the coupling member attached thereto;

FIG. 7 is a plan view of another embodiment of the socket member; and

FIG. 8 is a vertical sectional front view of still another embodiment of the socket member.

DETAILED DESCRIPTION OF THE PREFERRED EMBODIMENTS

Figure 1:
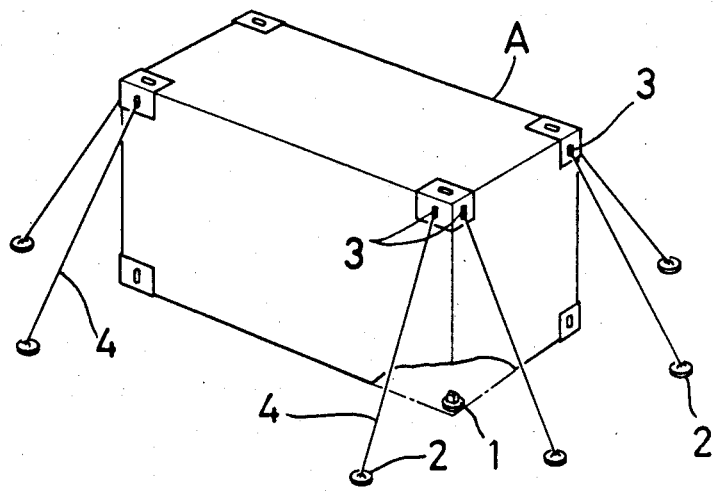
FIG. 1 is a perspective view of a conventional arrangement for supporting a container on board.
Figure 2:
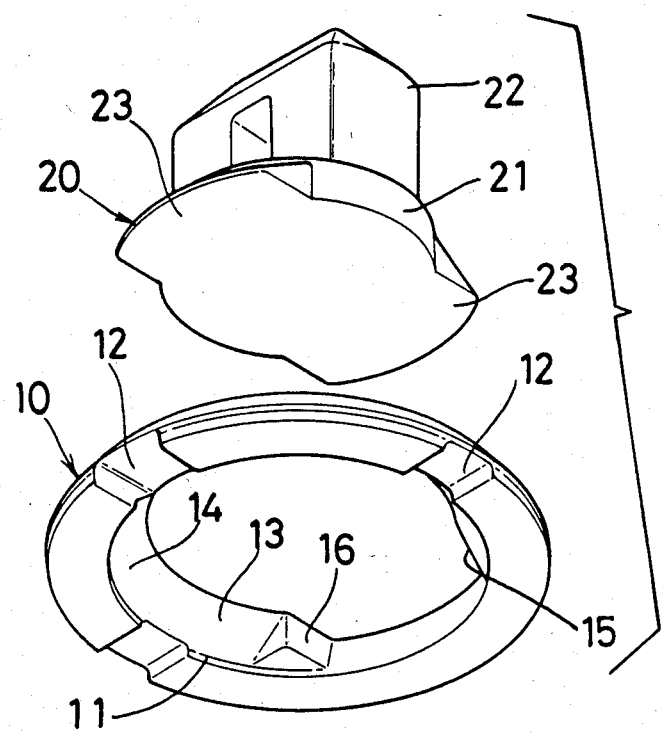
FIG. 2 is an exploded perspective view of an embodiment of the present invention.
Figure 3:
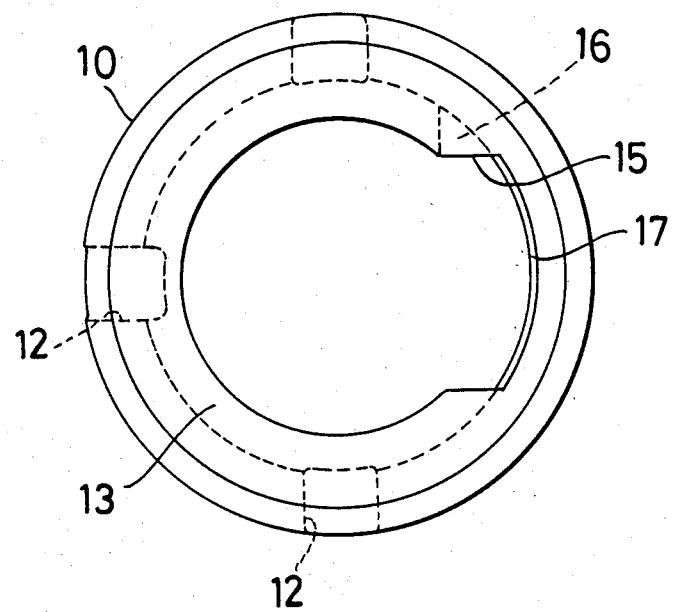
FIG. 3 is a plan view of the socket member thereof.
Figure 4:
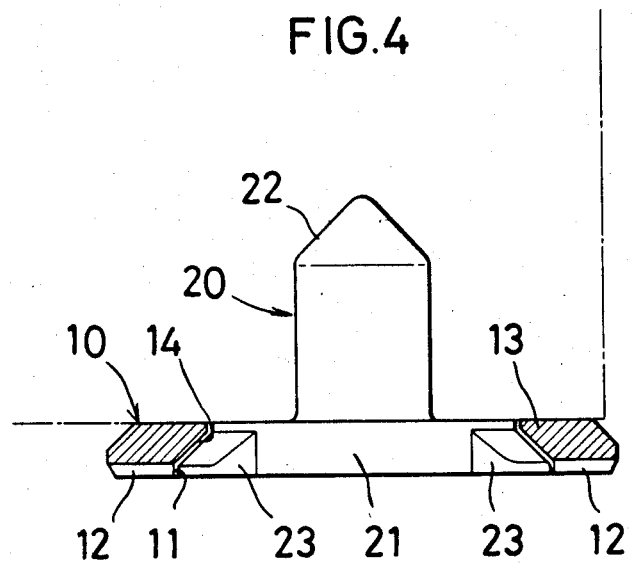
FIG. 4 is a vertical sectional side view of the socket member with the coupling member attached thereto.

Referring now to FIGS. 2 to 4, the deck fitting in accordance with the present invention comprises a combination of a socket member 10 adapted to be secured to the supporting surface of a freighter and a coupling member 20 adapted to be removably attached to the socket member 10.

The socket member 10 has a substantially circular hole 11. A plurality of grooves 12 formed in the undersurface of the socket member permits water to drain off from within the hole 11. A flange 13 formed at the periphery of the hole 11 has a tapered undersurface 14.

A portion of the flange 13 is cut away as shown at 15 in FIG. 2. One end of the cutaway portion 15 is defined by a blocking projection 16, which serves as a stopper for limiting the turn of the coupling member 20 with respect to the socket member. At the cutaway portion 15, the inner edge of the socket member is beveled outwardly as designated by the numeral 17 in FIG. 3.

The coupling member 20 comprises a circular base portion 21 turnable under the flange 13 of the socket member and a projection 22 in the form of a combination of a quadrangular prism and a quadrangular pyramid integrally formed on the upper surface of the base portion 21. A pair of projections 23 having an arcuate periphery for engaging with the flange 13 on the socket member are provided diametrically on the base portion 21. The upper surfaces of the projections 23 are beveled so as to form slanting surfaces complementary to the tapered undersurface 14 of the flange 13 on the socket member. The projections 23 are of such a size that they can be put in and taken out of the socket member 10 through the cutaway portion 15.

In operation, the socket member 10 is welded or otherwise secured to a supporting surface such as the deck of a freighter, and the coupling member 20 is detachably engaged with the socket member 10.

For engaging the coupling member 20 with the socket member 10, the former is brought over the latter and lowered with the base portion 21 inclined and oriented so that one of the two projections 23 may be thrusted into under the flange 13 on the socket member 10 and the other may be disposed over the cutaway portion 15 and then lowered so as to fit the base portion 21 of the coupling member 20 in the hole 11 of the socket member 10. The coupling member 20 is then turned on its own axis until one of the two projections 23 strikes (abuts) against the blocking projection 16 and thereby the coupling member 20 is prevented from turning further. Now, both projections 23 are disposed under the flange 13 so as to prevent the coupling member 20 from slipping out of the socket member.

For detaching the coupling member 20 from the socket member 10, the former is turned on its own axis in the direction reverse to the above until one of the two projections 23 comes to be in the cutaway portion 15. The coupling member 20 is pulled up inclined. The projection 23 disposed in the cutaway portion 15 slips out of it. Then the coupling member 20 is pulled aslant over the surface 17 so as to be detached from the socket member 10.

The construction of the coupling member 20 is not limited to the one shown in FIGS. 2 to 4 in the form of a positioning cone. It may be in the form of a lashing terminal as shown in FIGS. 5 and 6. This lashing terminal includes a ring 25 hingedly mounted on the upper surface of the base portion 21. A hook provided on one end of a turnbuckle is adapted to fit in the ring 25.

The foregoing description has been presented with reference to the socket member 10 provided with a single hole 11. However, for example, a pair of holes 11 may be disposed one at each end of a tabular socket member 10 as shown in FIG. 7, so that two coupling members 20 can be detachably attached thereto. A flange 13 is formed at the inner edge of each hole 11, and a portion of the flange 13 is cut away in the same manner as mentioned with reference to the first embodiment.

As shown in FIG. 8, the socket member 10 may be provided with a bottom 19.

The base portion 21 of the coupling member 20 need not necessarily be circular. Any form will do so long as the base portion 21 can be turned on its own axis in the hole 11 of the socket member 10. For example, a rectangular base portion 21 having a width just enough to permit its passage through the cutaway portion 15 may be used. Such a base portion 21 can be thrusted into the hole 11 from above the cutaway portion 15.

The projection 16 may be disposed in a position other than one end of the cutaway portion 15 so long as it can serve as a stopper for preventing the coupling member 20 from turning further in one direction.

The deck fitting in accordance with the present invention is stronger than the conventional deck socket. The differece in the strength is derived from the difference in the construction of a means for preventing the coupling member from slipping out. In the conventional deck socket, the detachable coupling member is prevented from slipping out of the fixed coupling member by a plurality of claws provided on the fixed coupling member and adapted to engage with a plurality of claws provided on the detachable coupling member. In the present invention, the coupling member 20 is prevented from slipping out of the socket member 10 by means of a pair of projections 23 having an arcuate periphery for engaging the flange 13. The flange is safe from damage because it is strong enough to withstand a sudden jerk given to the coupling member 20.

The deck fitting in accordance with the present invention has another advantage that the coupling member 20 can be easily attached to and detached from the socket member 10.

What I claim:

1. A deck fitting for positioning a container on a deck of a ship, comprising:
   a socket member formed with a substantially circular hole;
   a coupling member removably received in said hole;
   said socket member having a flange at the periphery of said hole, said flange extending all about said hole except for a single cutaway portion;
   said coupling member having a base portion turnable under said flange on said socket member and an engagement portion upwardly protruding from said base portion, said base portion having a pair of projections diametrically formed on an outer periphery of said base portion, said projections being of such a size that said base portion can be inserted into said hole under said flange on said socket member through said cutaway portion;
   said socket member being formed with a blocking projection on the undersurface of said flange for limiting the turn of said coupling member in one direction, said pair of projections being freely turnable under said flange until one of said pair of projections abuts said blocking projection while both of said pair of projections are under said flange.

2. A deck fitting as claimed in claim 1, wherein said socket member has a pair of substantially circular holes for receiving two coupling members.

3. A deck fitting as claimed in claim 1, wherein said coupling member is a positioning cone.

4. A deck fitting as claimed in claim 1, wherein said coupling member is a lashing terminal having a ring.

5. A deck fitting as claimed in claim 1, wherein said socket member has a bottom.

* * * * *